(12) United States Patent
Bilde

(10) Patent No.: US 8,727,633 B2
(45) Date of Patent: May 20, 2014

(54) BEARING SUPPORT ASSEMBLY

(75) Inventor: Morten Leth Bilde, Langa (DK)

(73) Assignee: AGCO A/S, Randers (DK)

( * ) Notice: Subject to any disclaimer, the term of this patent is extended or adjusted under 35 U.S.C. 154(b) by 0 days.

(21) Appl. No.: 13/382,932

(22) PCT Filed: May 28, 2010

(86) PCT No.: PCT/IB2010/001320
§ 371 (c)(1),
(2), (4) Date: Jan. 9, 2012

(87) PCT Pub. No.: WO2011/004225
PCT Pub. Date: Jan. 13, 2011

(65) Prior Publication Data
US 2012/0114275 A1 May 10, 2012

(30) Foreign Application Priority Data

Jul. 7, 2009 (GB) .................................. 0911765.6

(51) Int. Cl.
*F16C 19/52* (2006.01)
*F16C 35/06* (2006.01)
*F16C 33/78* (2006.01)
*A01D 75/18* (2006.01)

(52) U.S. Cl.
USPC ............ 384/624; 384/385; 384/428; 384/440

(58) Field of Classification Search
USPC ......... 384/426, 428, 441, 477, 556, 559, 572, 384/606, 385, 440, 473, 624; 29/898.055, 29/898.015
See application file for complete search history.

(56) References Cited

U.S. PATENT DOCUMENTS

| | | | | |
|---|---|---|---|---|
| 2,267,143 A | * | 12/1941 | Soldan | 209/366.5 |
| 2,734,785 A | * | 2/1956 | Toulmin, Jr. | 384/280 |
| 2,902,868 A | * | 9/1959 | Ferrara | 74/87 |
| 3,464,193 A | * | 9/1969 | Mason | 56/47 |
| 3,568,469 A | * | 3/1971 | Wade et al. | 464/160 |
| 3,655,226 A | | 4/1972 | Cowan | |
| 3,768,647 A | * | 10/1973 | Johnson | 209/364 |

(Continued)

FOREIGN PATENT DOCUMENTS

| | | | | |
|---|---|---|---|---|
| EP | 197853 A1 | * | 10/1986 | B23K 9/28 |
| EP | 0481632 A2 | | 4/1992 | |

(Continued)

OTHER PUBLICATIONS

International Search Report for International Application No. PCT/IB2010/001320 Dated Aug. 16, 2010.

(Continued)

*Primary Examiner* — Marcus Charles

(57) ABSTRACT

A bearing support assembly (10) comprising a bearing (12) supported within a bearing block (14) is provided. A shaft (26) is arranged to rotate within the bearing (12) and a disc member (34) is carried on the shaft (26) proximate to the bearing block (14). A ring member (20) is secured to the bearing block (14) so that in the event of bearing failure the disc member (34) engages with the ring member (20) so as to support the shaft (26) in rotational motion. The disc member has a diameter that is larger than the outer diameter of the ring member. The ring member (20) is at least partially recessed into the thickness of the disc member (34). The assembly may be utilized in agricultural machinery which include rotors (30) which are supported on rotating shafts. The ring member (20) may provide a labyrinth seal which inhibits the ingress of particulate matter into the bearing.

15 Claims, 4 Drawing Sheets

(56) References Cited

U.S. PATENT DOCUMENTS

| | | | |
|---|---|---|---|
| 4,063,786 A | | 12/1977 | Rall |
| 4,815,903 A | * | 3/1989 | Skidmore, Sr. ............... 409/131 |
| 6,095,729 A | * | 8/2000 | Pattison et al. ............... 409/230 |
| 6,464,435 B1 | * | 10/2002 | Chen ............................. 409/231 |
| 7,225,909 B1 | * | 6/2007 | Kalinsky et al. ........... 192/85.49 |
| 2003/0152433 A1 | | 8/2003 | Geissler |

FOREIGN PATENT DOCUMENTS

| | | | | |
|---|---|---|---|---|
| GB | 572482 A | | 10/1945 | |
| GB | 1362253 A | * | 7/1974 | .............. F16C 35/06 |
| JP | 63-118425 | * | 8/1988 | ............ F16C 35/077 |
| JP | 2001323996 A | * | 11/2001 | .............. A01B 33/08 |
| JP | 2008265141 A | * | 11/2008 | .............. B41F 15/26 |
| RU | 2214083 C2 | * | 1/2003 | .............. A01D 43/08 |

OTHER PUBLICATIONS

Great Britian Search Report for Great Britian Application No. 0911765.6 Dated Nov. 6, 2009.

* cited by examiner

BEARING SUPPORT ASSEMBLY

BACKGROUND OF THE INVENTION

The invention relates to bearing support assemblies in which a shaft carrying a disc member is supported for rotational movement by a bearing which is itself supported within a bearing block. In particular, but not exclusively so, the invention relates to the support of rotors which are mounted on a shaft and have a substantially cylindrical core which is carried on the shaft.

Machines which include rotors which are supported on a shaft and rotate at high speed often employ bearings which allow rotational movement of the shaft and rotor without excessive heat build up. However, even modern bearings can fail after a period of time of continued use and such failure carries the risk of damage to the shaft, and any associated rotor, if high speed rotational movement is continued.

United Kingdom published patent application No. GB-572,482 discloses a secondary, or emergency, bearing that augments a ball bearing. During normal operation, the secondary bearing does not contact the shaft supported by the ball bearing. Upon failure of the ball bearing, the secondary bearing comes into contact with the shaft.

BRIEF SUMMARY OF THE INVENTION

It is one object of the invention to provide an improved bearing support assembly which limits damage to the shaft in the event of bearing failure.

It is another object of the invention to provide an improved bearing support assembly suitable for application in agricultural machinery.

In accordance with the invention there is provided a bearing support assembly comprising a bearing supported within a bearing block, a shaft arranged to rotate within the bearing and carrying a disc member proximate to the bearing block, wherein a ring member is secured to the bearing block so that in the event of bearing failure the disc member engages with the ring member so as to support the shaft in rotational motion, wherein the disc member has a diameter that is larger than the outer diameter of the ring member, and wherein the ring member is at least partially recessed into the thickness of the disc member.

By providing a ring member which engages with the disc member upon failure of the bearing, damage to the shaft and any structure supported thereby is reduced. Significant radial displacement of the shaft is prevented by the engagement of the ring member with the disc member thereby allowing continued use, on at least a temporary basis, of the machine embodying the bearing support assembly.

Advantageously, the invention may deliver a labyrinth seal which serves to prevent the escape of lubricating oil or grease and also to prevent the ingress of dirt from the environment into the supported bearing. To further improve the labyrinth seal the ring member may be recessed into an annular channel in the disc member.

Preferably, the ring member serves to retain the bearing in the hearing block thereby reducing the number of components required, saving cost and assembly time as a result. The ring member may be secured by the bearing block by bolts, the heads of which are preferably recessed into the ring member so as to avoid conflict with the rotational movement of the proximate disc member.

To avoid radial stresses the ring member may be partially recessed into an outer face of the bearing block. The recess may be machined into the bearing block during fabrication thereof.

Preferably, the ring member is formed of plastic. A conventional labyrinth sealing typically comprises two metal parts with a small gab between, wherein one part rotates and the other part is fixed. The use of metal dictates that the respective parts must not touch each other during operation. Any contact between the two parts will create heat, noise and rapid wear. In order to avoid any contact a relatively large gab is usually provided between the parts. In turn, this reduces the effectiveness of the labyrinth seal. By using a plastic material for one of the parts, i.e. the ring member, these problems are avoided. The consequential damage caused by the two parts touching is reduced due to the lower friction therebetween. Therefore, the gap between the two parts can be safely reduced thus increasing the effectiveness of the labyrinth seal. In other words, the bearing support assembly allows a very small gab between the ring member and the disc member and thereby an effectively sealing.

Preferably, the disc member, the bearing block, the bearing and the ring member define walls of a cavity which can retain grease to lubricate the bearing thereby extending the life time of the bearing and extending the periods between servicing thereof.

A further cavity may be provided adjacent the bearing on the side remote the disc member. The bearing block may comprise a grease inlet path for allowing filling of the further cavity with grease from the outside, and wherein the grease can pass through the bearing into the first cavity. In one exemplary embodiment the bearing is a ball bearing which commits the passage of grease from one side to the other.

According to a further aspect of the invention the assembly may be embodied on an agricultural machine wherein a rotor having a substantially cylindrical core is carried on the shaft and wherein an end wall of the cylindrical core provides the disc member. Agricultural harvesting machines often operate in environments having a large percentage of particulate matter such as dust and chaff. The invention has particularly advantageous application within agricultural machines.

Harvesting machines can suffer significant damage upon failure of a bearing in addition to significant down time of the machine, potentially during a critical harvest period for example. By incorporating a ring member in accordance with the invention, a rotor shaft can be held substantially in a radial position in the event of failure of a bearing thereby allowing continued use of the machine.

The straw material in harvesting machinery has a tendency to wrap around the rotating parts. Conventional rubber seals are prone to failure due to the heat build up caused by the wrapped straw. By providing a labyrinth seal instead (as described above), solid parts can be employed which can resist the stress of wrapped straw.

Also, in the case of the ring member providing a labyrinth seal, dust and general dirt ingress into the bearing is at least severely limited thereby extending lifetime and efficiency of the bearing.

Although applicable to any agricultural machine having a rotor supported on a shaft for rotational movement, the invention lends itself particularly well to harvesting equipment such as balers and combine harvesters which operate in a dusty environment. In one preferred embodiment, a combine harvester comprises a longitudinally disposes separating rotor, hereinafter referred to as an 'axial separating rotor, which is mounted on a shaft and supported by a bearing support assembly in accordance with the invention.

Axial separating rotors are typically located deep within the volume of a combine harvester and replacement of the bearings which support the rotor can be extremely time consuming. Such replacement during a critical harvest period can be very costly and may result in the missing of a slot of good weather resulting in loss of a crop. By incorporating a ring member in accordance with the invention into the rotor support, continued use of the combine may be allowed, at least for a temporary period. In any case, further damage to the associated components is avoided by preventing radial displacement of the rotor support shaft.

BRIEF DESCRIPTION OF THE DRAWINGS

Further advantages of the invention will become apparent from the following description of specific embodiments with reference to the appended drawings in which:—

DETAILED DESCRIPTION OF THE INVENTION

Figure 1:
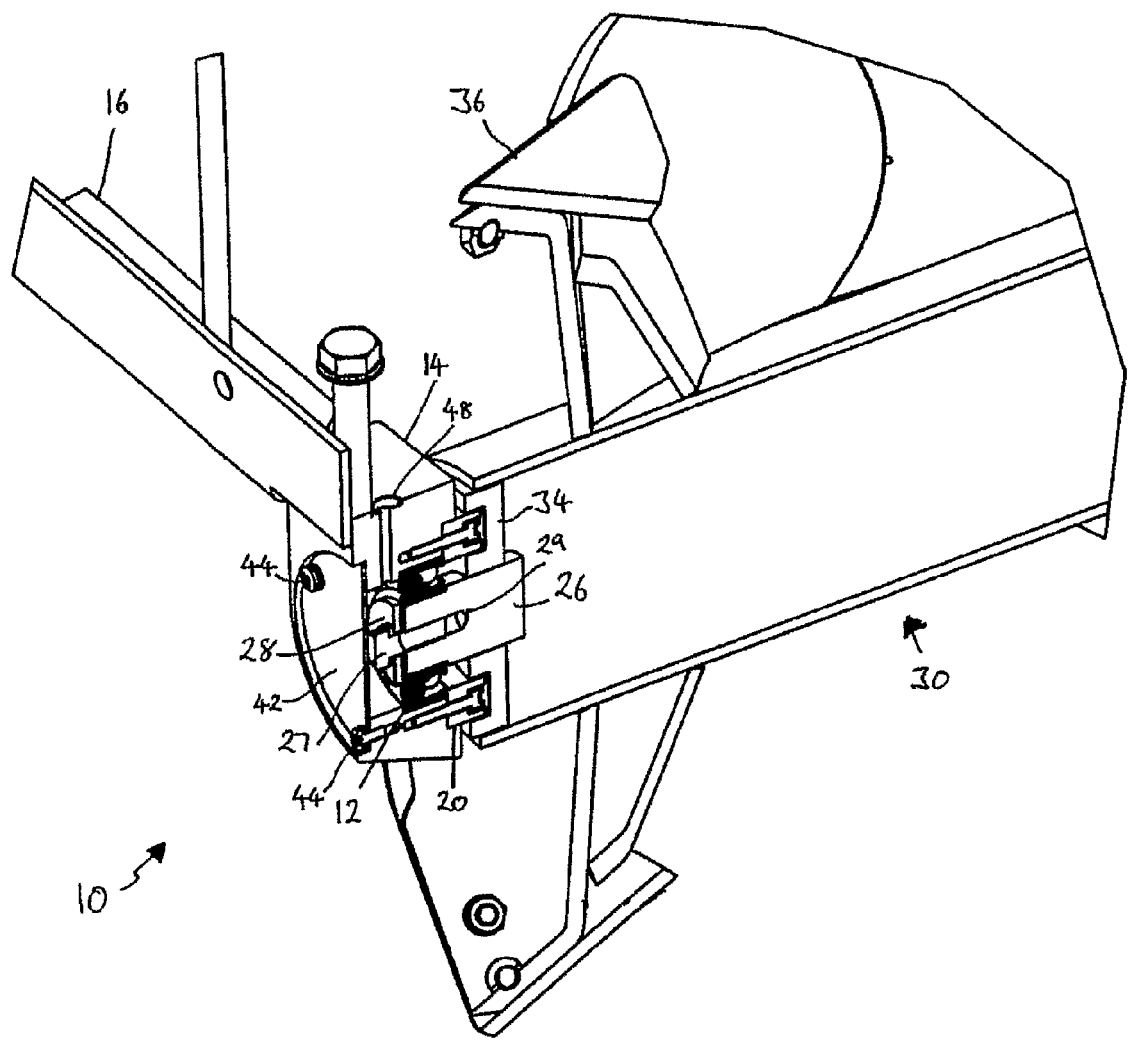
FIG. 1 is a perspective view showing a section through a bearing support assembly in accordance with the invention.
Figure 2:
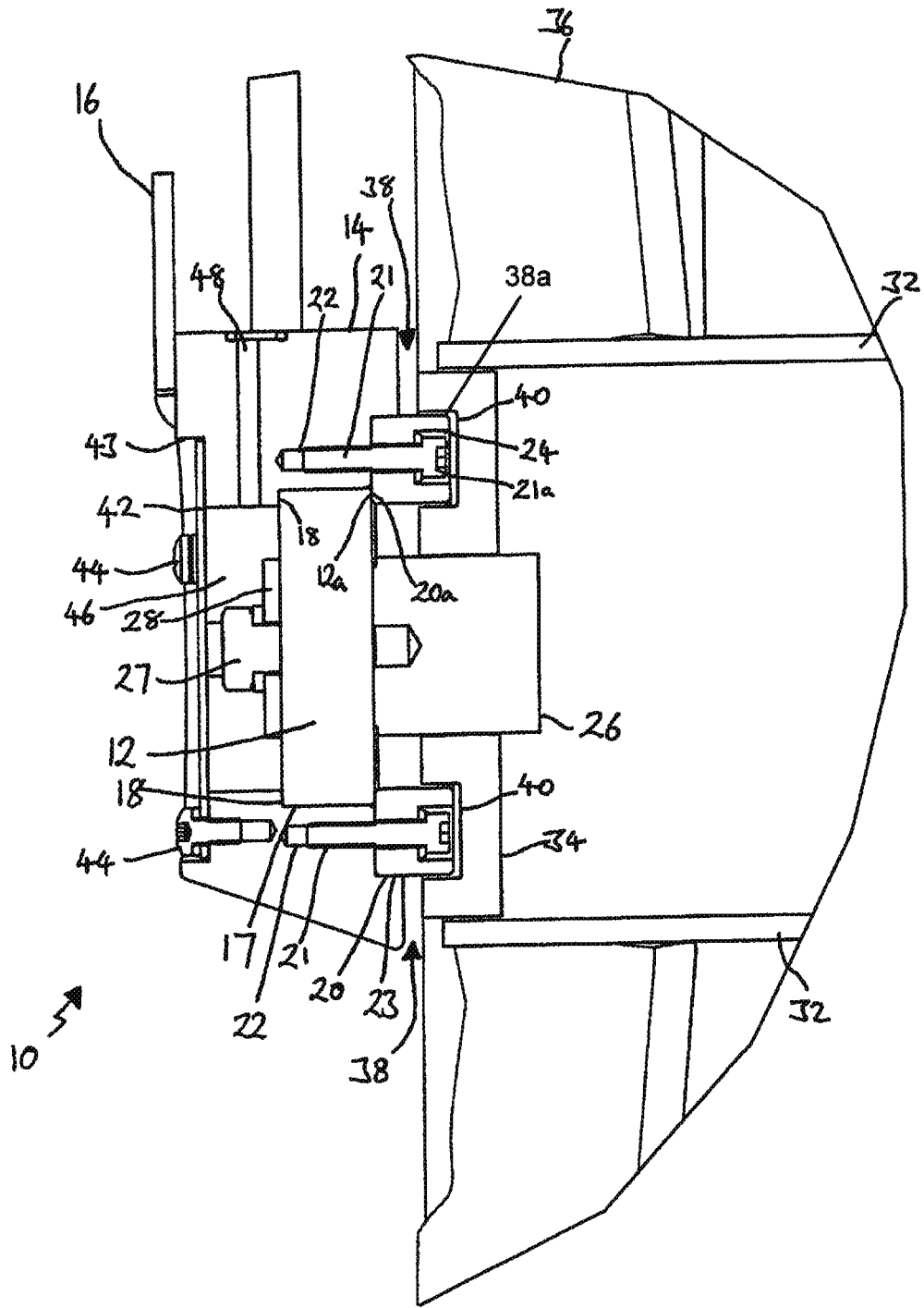
FIG. 2 is an elevational view of the bearing support assembly of FIG. 1.

With reference to FIGS. 1 and 2, a bearing support assembly 10 comprises a self-aligned ball bearing 12 supported within a machined bearing block 14. It should be recognised that the self-aligned ball bearing 12 may be replaced with a more basic ball bearing, a roller bearing or other suitable type. In the embodiment shown, the bearing block 14 is secured to a frame 16 which may be fixed relative to a machine.

The ball bearing 12 is held within a recess 17 against an annular lip 18 which is machined into the bearing block 14. A ring member 20, formed of nylon or other plastic material, is bolted to the bearing block 14 by bolts 21 which screw into machined holes 22. The ring member 20 is seated within a recess 23 machined into the bearing block 14 and which has a depth that is flush with the outside edge of recess 17. The recessing of ring member 20 in this way increases the radial support thereof in addition to that provided by bolts 21.

The inside edge 20a of ring member 20 overlaps with the outside edge 12a of ball bearing 12 so as to secure and hold the latter in position against lip 18. Bolt heads 21a are recessed into the ring member 20 in an annular slot 24 formed within the ring member.

The inside edge 20a of ring member 20 overlaps with the outside edge of ball bearing 12 so as to secure and hold the latter in position against lip 18. Bolt heads 21a are recessed into the ring member 20 in an annular slot 24 formed within the ring member.

A shaft 26 is secured within the ball bearing 12 by a bolt 27 which extends through a plate 28 held against the outside surface of bearing 12, and into a bore 29 machined into the axis of rotation of shaft 26. Bearing 12 allows rotational movement of the shaft 26.

A rotor 30 having a cylindrical housing 32 and an end wall provided by disc member 34 is supported on the shaft 26 by means of the latter extending through a central hole within the disc member 34. In the embodiment shown in FIGS. 1 and 2, the rotor 30 provides a core upon which flighting 36 can be fixed to convey crop material in an agricultural machine.

The disc member 34 is held in close proximity to the bearing block 14, at a distance of about 4 mm, wherein the ingress of dust and dirt through gaps 38 is minimized whilst allowing free rotational movement. The outside edges of ring member 20 are recessed into the facing surface of disc member 34 within an annular channel 40. This delivers two advantages to the bearing support assembly 10.

Firstly, a labyrinth seal 38a is provided by the recessed ring member 20 wherein dirt ingress via gaps 38 is prevented. Furthermore, the labyrinth seal 38a prevents the escape of lubricating grease from the bearing 12 through gap 38.

Secondly, and perhaps more significantly, in the event of failure of bearing 12, the rotor 30 is held in radial position by the engagement between the surfaces of ring member 20 and the recess 40 provided in disc member 34. Subsequent rotational motion of the rotor 30 does not, therefore, cause immediate damage to the shaft 26 whilst the disc member 34 is supported by ring member 20. Although damage to the ring member 20 may eventually occur, the latter can be formed of a cheap plastic material which can be replaced at low cost and which is by far outweighed by the cost saving associated with the prevention of damage to the shaft 26.

In an alternative arrangement (not shown) the ring member 20 may include an additional flange to at least partially fill the gap 38.

Turning back to FIG. 2, a cover plate 42 is held within a recess 43 machined into bearing block 14 on the side remote the rotor 30 by screws 44. The cover plate 42 provides a sealed grease chamber 46 together with the labyrinth seal provided by ring member 20, the disc member 34 and the machined inside edges of bearing block 14. Grease may be routinely pumped into the grease chamber 46 by the operator via a grease inlet path 48 formed within the bearing block 14. It should be recognised that the grease within chamber 46 can pass readily through a ball bearing 12 and onto the side adjacent rotor 30.

Figure 3:
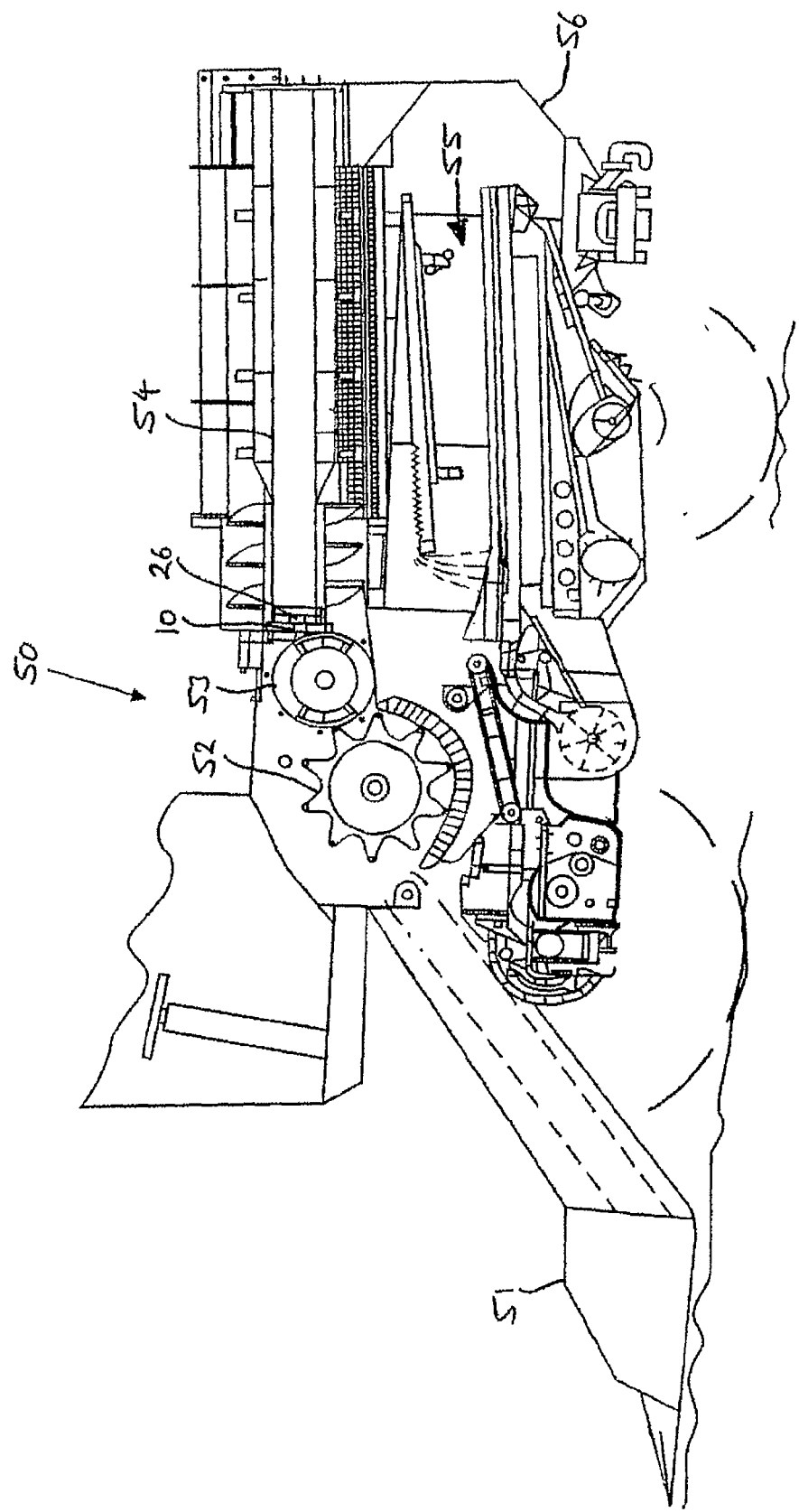
FIG. 3 is an elevational view of a section through a combine harvester embodying the hearing support assembly in accordance with the invention.

As mentioned above, the bearing support assembly described lends itself particularly well to application in agricultural machines which operate in dirty environments and suffer from particulate matter ingression into bearings. With reference to FIG. 3, a combine harvester 50 comprises a header 51, a transverse threshing drum 52, a transverse feed beater 53, an axially disposed rotor 54, a cleaning shoe arrangement 55 and a straw discharge region 56. The axial separating rotor 54 is held on a shaft 26 which is supported for rotational movement within a bearing support assembly referenced generally at 10. Although not shown in FIG. 3, the rear end of axial separating rotor 54 may also be supported by a bearing support assembly in accordance with the invention.

Figure 4:
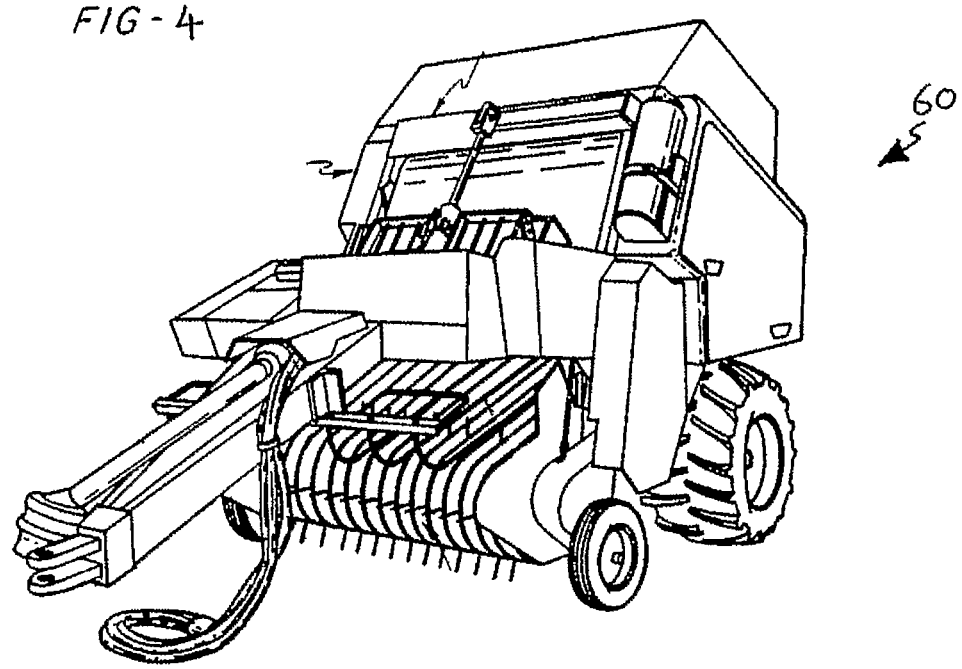
FIG. 4 is a perspective view of a baler embodying a bearing support assembly in accordance with the invention.
Figure 5:
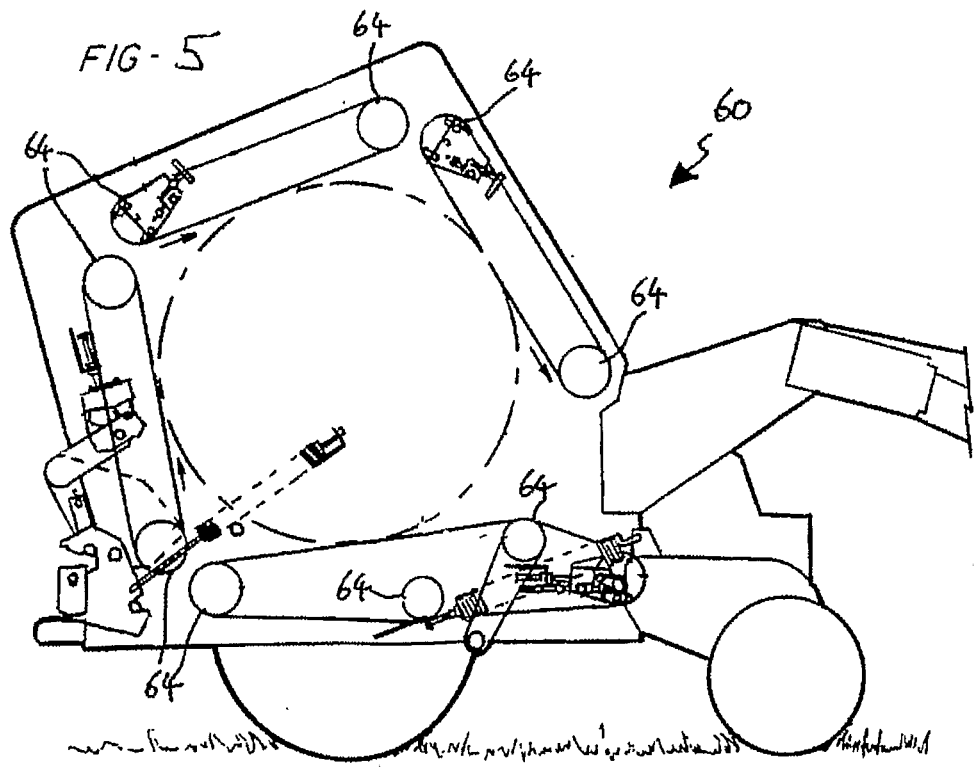
FIG. 5 is a sectional view of the baler of FIG. 4.

FIG. 4 and FIG. 5 show a round baler 60 which includes a number of transversely rotating shafts 64. Any one of transverse shafts 64 may be supported by a bearing support assembly as described above.

From reading the present disclosure, other modification will be apparent to persons skilled in the art. Such modifications may involve other features which are already known in the field of bearing support assemblies and component parts therefore and which may be used instead of or in addition to features already described herein.

The invention claimed is:

1. A bearing support assembly comprising a bearing supported within a bearing block, a shaft arranged to rotate within the bearing and carrying a disc member proximate to the bearing block, wherein a ring member is secured to the bearing block so that in the event of bearing failure the disc member engages with the ring member so as to support the shaft in rotational motion, wherein the disc member has a diameter that is larger than the outer diameter of the ring member, and wherein the ring member is at least partially recessed into the thickness of the disc member.

2. An assembly according to claim 1, wherein the ring member is secured to the bearing block by bolts.

3. An assembly according to claim 2, wherein the bolts comprise heads that are recessed into the surface of the ring member which faces the disc member.

4. An assembly according to claim 1, wherein the ring member serves to retain the bearing in the bearing block.

5. An assembly according to claim 1, wherein the ring member is partially recessed into an outer face of the bearing block.

6. An assembly according to claim 1, wherein the ring member is recessed into an annular channel in the disk member.

7. An assembly according to claim 6, wherein a labyrinth seal is provided between the bearing and the surroundings by the proximity of the ring member to the disc member.

8. An assembly according to claim 1, wherein the disc member, the bearing, the shaft and the ring member define walls of a cavity which can retain grease to lubricate the bearing.

9. An assembly according to claim 8, wherein a further cavity is provided adjacent the bearing on the side remote the disc member, the bearing block comprising a grease inlet path for allowing filling of the further cavity with grease from the outside, and wherein the grease can pass through the bearing into the first cavity.

10. An assembly according to claim 1, wherein the ring is plastic.

11. An agricultural machine comprising a rotor having a substantially cylindrical core which is carried on a shaft, wherein the shaft is mounted to a bearing support assembly according to claim 1, and wherein an end wall of the cylindrical core provides the disc member.

12. An agricultural machine according to claim 11, wherein the rotor is a longitudinal separating rotor.

13. An agricultural machine according to claim 11, wherein an end wall of the cylindrical core provides the disc member.

14. An agricultural machine according to claim 11, wherein the ring member serves to retain the bearing in the bearing block.

15. An agricultural machine comprising a rotor having a substantially cylindrical core which is carried on a shaft, wherein the shaft is mounted to a bearing support assembly, wherein the bearing assembly comprises a bearing supported within a bearing block, a shaft arranged to rotate within the bearing and carrying a disc member proximate to the bearing block, wherein a ring member is secured to the bearing block so that in the event of bearing failure the disc member engages with the ring member so as to support the shaft in rotational motion, wherein the disc member has a diameter that is larger than the outer diameter of the ring member, and wherein the ring member is at least partially recessed into the thickness of the disc member.

* * * * *